United States Patent [19]

Kunze

[11] Patent Number: 5,027,236
[45] Date of Patent: Jun. 25, 1991

[54] MAGNETIC TAPE CASSETTE APPARATUS HAVING A CASSETTE CATCH WITH SPRING ARMS

[75] Inventor: Norbert Kunze, Ehringshausen, Fed. Rep. of Germany

[73] Assignee: U.S. Philips Corporation, New York, N.Y.

[21] Appl. No.: 381,568

[22] Filed: Jul. 18, 1989

[30] Foreign Application Priority Data

Jul. 19, 1988 [DE] Fed. Rep. of Germany ....... 8809235

[51] Int. Cl.$^5$ ........................................... G11B 15/675
[52] U.S. Cl. .................................................. 360/96.5
[58] Field of Search .................... 360/96.5, 96.6, 93

[56] References Cited

U.S. PATENT DOCUMENTS 4,802,039 1/1989 Hatanaka ............................ 360/96.5
4,825,312 4/1989 Yoshikawa et al. ................ 360/96.5
4,945,431 7/1990 Kunze ................................. 360/96.5

Primary Examiner—David J. Severin

[57] ABSTRACT

Magnetic tape cassette apparatus (1) having a drive mechanism which is used for playing magnetic tape cassettes and has a cassette loading mechanism which by means of a lift lever (3) moves a cassette tray (1a) with a cassette (2) accommodated by the latter between an eject position and a playing position, a cassette catch (9) being guided in a guideway of the lift lever (3) so as to be displaceable in the draw-in direction of the cassette tray (1a) between an eject and a draw-in position and the cassette tray (1a) being raised into the eject position when the cassette catch (9) is in the eject position, and the cassette catch (9) having spring arms (26) which, in the eject position, press resiliently against parts of the cassette tray (1a) and of the lift lever (3).

6 Claims, 1 Drawing Sheet

Fig.1
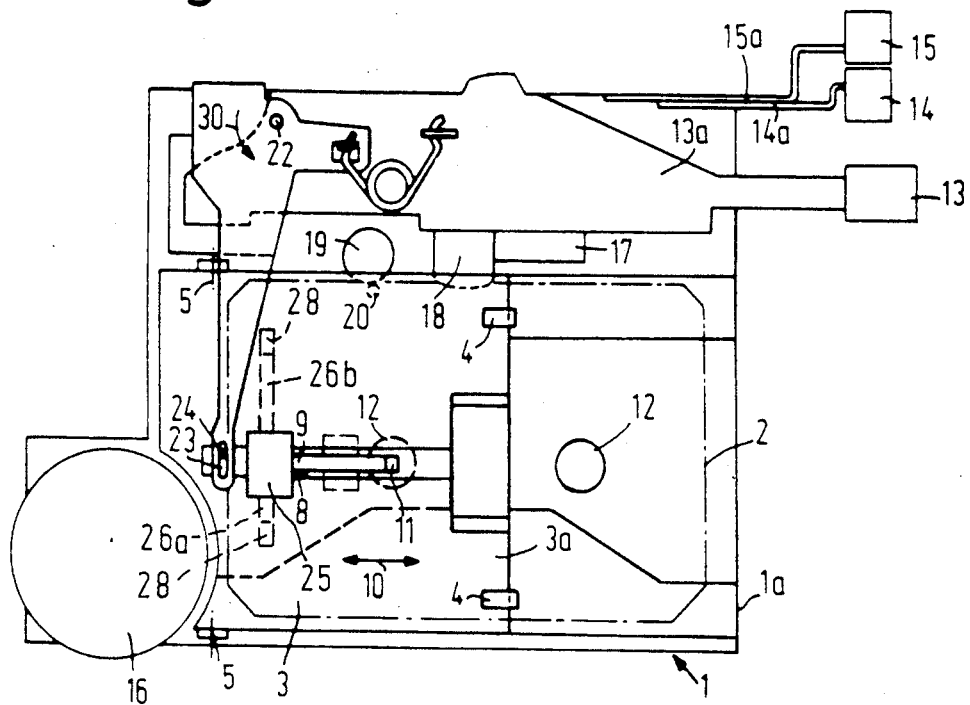
Fig.2
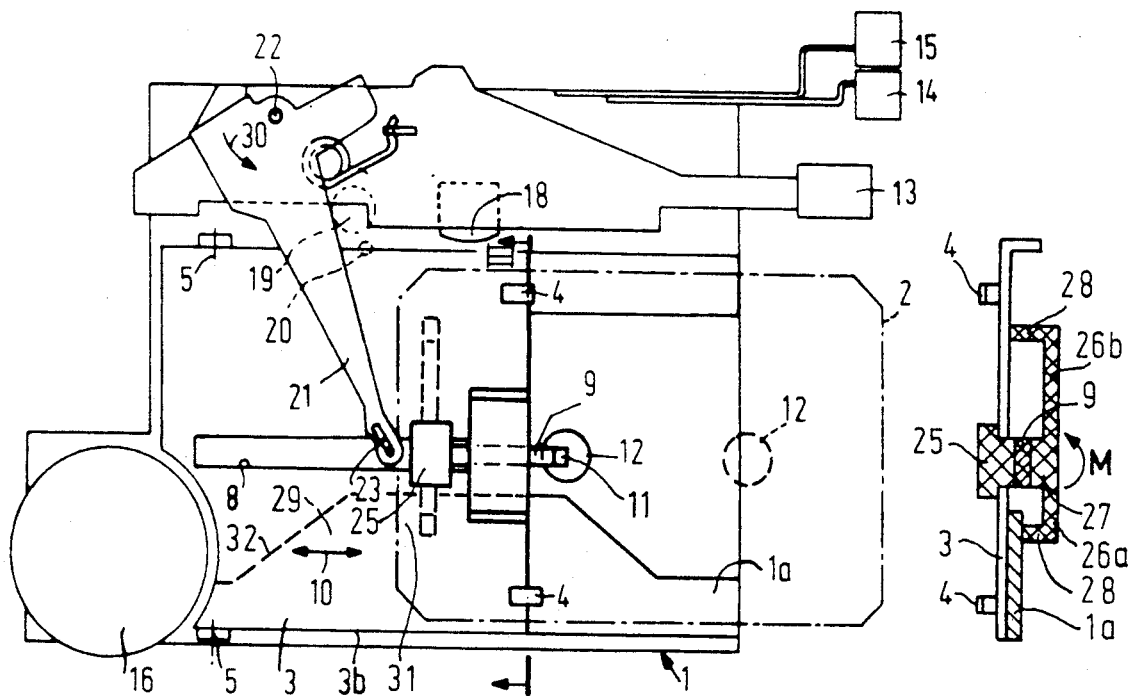
Fig.3

MAGNETIC TAPE CASSETTE APPARATUS HAVING A CASSETTE CATCH WITH SPRING ARMS

DESCRIPTION

The innovation relates to a magnetic tape cassette apparatus having a drive mechanism which is used for playing magnetic tape cassettes and has a cassette loading mechanism which by means of a lift lever moves a cassette tray with a cassette accommodated by the latter between an eject position and a playing position, a cassette catch being guided in a guideway of the lift lever so as to be displaceable in the draw-in direction of the cassette tray between an eject and a draw-in position and the cassette tray being raised into the eject position when the cassette catch is in the eject position.

Drive mechanisms of magnetic tape cassette apparatuses are provided with a loading mechanism which has a cassette tray into which a cassette is manually pushed. The cassette can rest loosely in the cassette tray if it has not yet been accepted by the cassette draw-in means or, following playing, has been pushed out into the eject position again by the cassette draw-in means.

The loading mechanism of a magnetic tape cassette apparatus has a lift mechanism by means of which the cassette tray with cassette pushed in can be lowered out of the eject position into the playing position and can be raised again out of the latter into the eject position. The lowering and raising of the cassette tray is accomplished with the aid of a lift lever which is pivotable about a horizontal axis and by its forward end engages in articulated fashion but loosely on the cassette tray. The lowering or raising of the lift lever can be effected by means of a control rod and a bracket which acts on an operating lever for the lift lever.

In the downward-pivoted position of the lift lever, said lever presses by its free end against the lowered cassette tray. In the raised position, in which the cassette tray is in the eject position, the interacting articulation parts of cassette tray and lift lever are approximately parallel to one another. A cassette catch can be displaced in the draw-in direction in the lift lever. This cassette catch can engage by a lug in a winding hole of a cassette. The cassette can be drawn into the cassette tray or ejected from the latter by the forward or backward movement of the cassette catch. This longitudinal movement is accomplished with the aid of an operating lever. The cassette catch, which is in general an injection-moulded plastics part, must be guided with relatively large tolerances in the cassette lift. As a result, in the eject position the cassette catch rests rather loosely in relation to the cassette lift; this can lead to rattling phenomena. In addition, the cassette catch cannot influence rattling tolerances between the lift lever and the cassette tray.

It is the object of the innovation to counteract with a few simple components rattling phenomena of the loading mechanism on a magnetic tape cassette apparatus.

The object set is achieved according to the innovation by the fact that the cassette catch has spring arms which, in the eject position, press resiliently against parts of the cassette tray and of the lift lever.

By virtue of the resilient pressure, cassette catch, lift lever and cassette tray are stressed against one another. By virtue of the stressing, the free play of the parts relative to one another disappears and the rattling noises are prevented.

According to a further development of the innovation, it is provided that the spring arms project from the cassette catch approximately transversely to the direction of displacement and, at their free ends away from the cassette catch, are raised and bent away in a direction towards faces of the cassette tray and of the lift lever. As a result, a defined resilient contact pressure between cassette tray and lift lever is produced.

According to a further development of the innovation, it is provided that the spring arms form a rocker which can be tilted about an extension of the cassette catch. A particularly controlled stressing is thereby achieved.

According to a further development of the innovation, it is provided that, when it presses against the cassette tray, the spring arm interacting with the cassette tray presses the spring arm for the lift lever against the lift lever. The stressing between cassette catch and lift lever is in this way reinforced.

According to a further development of the innovation, it is provided that the cassette catch together with its spring arms comprises one injection-moulded plastics part.

The innovation is illustrated in greater detail with reference to the drawing, in which:

FIG. 1 shows a magnetic tape cassette apparatus having a loading mechanism and a lift lever in the playing position, spring arms of a cassette catch serving to suppress rattling noises, FIG. 2 hows the magnetic tape cassette apparatus according to FIG. 1 in the eject or removal position, FIG. 3 shows an illustration of the interaction of cassette catch, spring arms of the cassette catch and lift lever along a line III—III according to FIG. 2.

The magnetic tape cassette apparatus 1 illustrated in simplified form in FIG. 1 has a cassette tray 1a into which a compact cassette 2 has been pushed. The cassette tray 1a can be lowered perpendicularly to the plane of the drawing with the aid of a lift lever 3 which engages by its forward end 3a under retaining tabs 4 of the cassette tray 1. The lift lever 3 can be pivoted about an axis 5. In the lift lever 3 there is a slot guideway 8 in which a cassette catch 9 can be displaced in the direction of a double arrow 10. At its forward end, the cassette catch 9 is provided with a lug 11 which has slotted into a winding hole 12 of the magnetic tape cassette 2.

For executing the tape drive functions, push buttons 13, 14, 15 having push button rods 13a, 14a and 15a are provided. All movements of the tape drive are generated with the aid of a motor 16.

A head plate 17 is provided on which are arranged a magnetic head 18 and a pinch roller 19. The pinch roller 19 co-operates with a capstan 20.

An operating lever 21 can be pivoted about an axis 22. At its free end, the operating lever 21 engages with a slot 23 over a peg 24 of the cassette catch 9. In this arrangement the lug 11 of the cassette catch 9 engages in one of the winding holes 12 of the cassette and holds the cassette firmly in the drawn-in position. The cassette catch 9 engages over the guideway 8 by a supporting block 25 onto which two spring arms 26 are integrally moulded. The cassette catch 9 with the supporting block 25 and the spring arms 26 is an integral injection-moulded plastics part.

In the illustration according to FIG. 2, the operating lever 21 has been pivoted in the direction of the arrow 30 and the cassette 2 is in its eject position. The cassette catch 9 has been pushed by the operating lever 21 via the peg 24 into the eject position, having taken the cassette 2 along into this position, i.e. pushed it out. Whereas, in the position according to FIG. 1, the cassette tray 1a was lowered with the forward end 3a of the lift lever 3 lowered, in the illustration according to FIG. 2 the cassette tray 1a is raised and the cassette tray 1a and the lift lever 3 are to a large extent parallel. In the position according to FIG. 2, the cassette tray 1a is in the raised eject position.

As FIG. 3 shows, the spring arms 26 are provided on an extension 27 which extends a short distance into the cassette tray 1a and the supporting block 25 of the cassette catch 9. Both spring arms 26a and 26b project from the extension 27 approximately transversely to the displacement direction 10 of the cassette catch 9, form a rocker and can tilt in common about the projection 27 as bearing. At their free ends, both spring arms 26a and 26b are raised in a direction towards the cassette tray 1a and the lift lever 3 to form stressing pieces 28. The stressing piece 28 of the spring arm 26a is here capable of pressing against the underside of a part of the cassette tray 1a and the stressing piece 28 of the spring arm 26b can press against the underside of a part of the lift lever 3. The cassette tray 1a is provided with a metal cut part 29 which is taken from the edge 3b of the cassette tray in the forward region 31 of the lift lever to very close to the guideway, and in particular has a sloping edge 32. As can be seen from FIG. 1, in the playing position the stressing piece 28 of the spring arm 26a lies behind the edge 32 and the stressing piece 28 cannot therefore press against the underside of the cassette tray 1a. In the position according to FIG. 1, the forward end 3a of the lift lever 3 is tilted downwards in the region 3a. However, the stressing piece 28 of the lever arm 26b nevertheless lies directly in front of the underside of the lift lever. If the operating lever 21, with all the functions connected with it and described already, is pivoted in the direction of the arrow 30 and if the cassette tray 1a has been raised as in the case of the illustration according to FIG. 2, the stressing piece 28 of the lever arm 26a has run up onto the edge 32 and now presses against the underside of the cassette tray 1a. This means that the rocker, comprising the two spring arms 26a and 26b, has been pressed downward in arm region 26a, as a result of which the spring arm 26b was pressed upwards and now presses more strongly against the lift lever.

In this way, a mutual stressing of cassette tray 1, lift lever 3 and cassette catch 9 comes about and rattling noises are avoided. The moment of reaction of the rocker comprising the spring arms 26a and 26b is designated by M in FIG. 3. If, following the pushing in of a cassette 2, the cassette catch 9 is pushed backwards into the playing position again, the stressing piece 28 leaves the underside of the cassette tray 1 and the overlap between stressing piece 28 and cassette tray 1 is lost; the rocker pivots back counter to the moment M, which is now no longer present.

I claim:

1. Magnetic tape cassette apparatus (1) having a drive mechanism which is used for playing magnetic tape cassettes and a cassette loading mechanism which by means of a lift lever (3) moves a cassette tray (1a) with a cassette (2) accommodated by the latter between an eject position and a playing position, a cassette catch (9) being guided in a guideway of the lift lever (3) so as to be displaceable in the draw-in direction of the cassette tray (1a) between an eject and a draw-in position and the cassette tray (1a) being raised into the eject position when the cassette catch (9) is in the eject position, characterized in that the cassette catch (9) has spring arms (26) which, in the eject position the cassette catch (9), press resiliently against parts of the cassette tray (1a) and of the lift lever (3).

2. Magnetic tape cassette apparatus according to claim 1, characterized in that the spring arms (26) project from the cassette catch (9) approximately trasversely to a direction of displacement (10) of the cassette catch (9) and, at their free ends away from the cassette catch (9), are bent away in a direction towards faces of the cassette tray (1a) and of the lift lever (3).

3. Magnetic tape cassette apparatus according to claim 2, characterized in that the spring arms (26a,26b) form a rocker which can be tilted about an extension (27) of the cassette catch (9).

4. Magnetic tape cassette apparatus according to claim 3, characterized in that the cassette catch with the extension and spring arms is an integral injection-moulded plastics part.

5. Magnetic tape cassette apparatus according to claim 3, characterized in that, when it presses against the cassette tray (1a), the spring arm (26a) interacting with the cassette tray (1a) presses the spring arm (26b) for the lift lever (3) against the lift lever (3).

6. Magnetic tape cassette apparatus according to claim 5, characterized in that the cassette catch (9) with the extension (27) and spring arms (26a, 26b) is an integral injection-moulded plastics part.

* * * * *